United States Patent
Chuberre et al.

(10) Patent No.: US 7,623,554 B2
(45) Date of Patent: Nov. 24, 2009

(54) MULTIPLEXING DEVICE, A DEMULTIPLEXING DEVICE, AND A MULTIPLEXING/DEMULTIPLEXING SYSTEM

(75) Inventors: Nicolas Chuberre, Tournefeuille (FR); Jean Farineau, Levallois Perret (FR); Régis Lenormand, Blagnac (FR); Jérome Fabre, La Salvetat St Gilles (FR); Grégory Maman, Toulouse (FR)

(73) Assignee: Thales, Neuilly sur Seine (FR)

( * ) Notice: Subject to any disclaimer, the term of this patent is extended or adjusted under 35 U.S.C. 154(b) by 763 days.

(21) Appl. No.: 10/622,550

(22) Filed: Jul. 21, 2003

(65) Prior Publication Data
US 2005/0100056 A1 May 12, 2005

(30) Foreign Application Priority Data
Jul. 22, 2002 (FR) .................................. 02 09263

(51) Int. Cl.
*H04J 3/04* (2006.01)
(52) U.S. Cl. ...................... 370/535; 370/532; 370/533; 370/534; 370/536; 370/537; 370/538; 370/539; 370/540; 370/542
(58) Field of Classification Search ......... 370/532–540, 370/542
See application file for complete search history.

(56) References Cited

U.S. PATENT DOCUMENTS

| 4,962,497 A * | 10/1990 | Ferenc et al. ............... 370/354 |
| 6,507,590 B1 * | 1/2003 | Terho et al. ................. 370/466 |
| 6,721,282 B2 * | 4/2004 | Motley ....................... 370/252 |
| 7,106,738 B2 * | 9/2006 | Saidi et al. .................. 370/392 |
| 2002/0009060 A1 | 1/2002 | Gross |
| 2002/0038373 A1 | 3/2002 | Border et al. |
| 2002/0093928 A1 * | 7/2002 | LoGalbo et al. ............. 370/336 |
| 2002/0093963 A1 | 7/2002 | Roullet et al. |
| 2002/0116707 A1 * | 8/2002 | Morris et al. ................. 725/37 |
| 2002/0154646 A1 * | 10/2002 | Dubois et al. ............... 370/406 |

FOREIGN PATENT DOCUMENTS

EP  1179918 A2  2/2002

* cited by examiner

*Primary Examiner*—William Trost, IV
*Assistant Examiner*—Toan D Nguyen
(74) *Attorney, Agent, or Firm*—Sughrue Mion, PLLC

(57) ABSTRACT

The invention relates to a multiplexing device comprising a data compressor. The compressed data block leaving said compressor occupies a particular bandwidth.

According to the invention, a bandwidth prediction unit calculates said bandwidth and deduces from it the available bandwidth for conveyance in a time space dedicated to Internet traffic.

The invention also relates to a multiplexing device and a multiplexing/demultiplexing system.

Particular application in a satellite telecommunication system.

20 Claims, 12 Drawing Sheets

FIG_1 RELATED ART
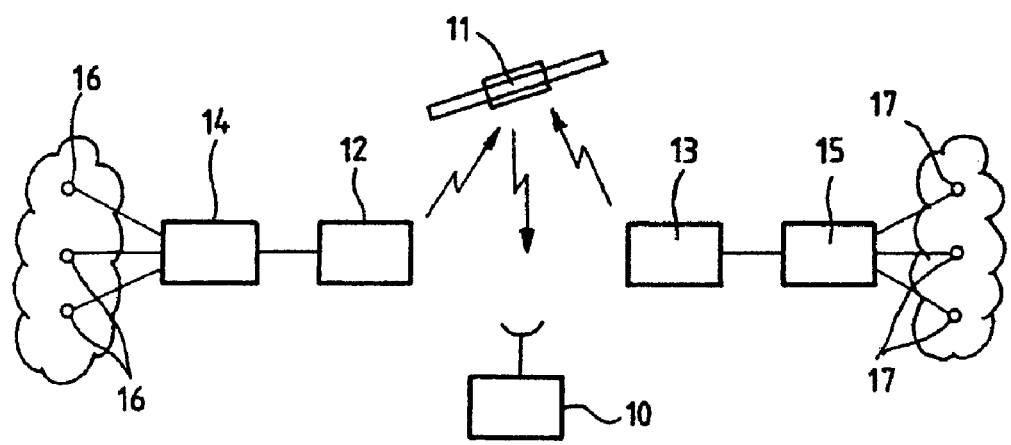
FIG_2 RELATED ART
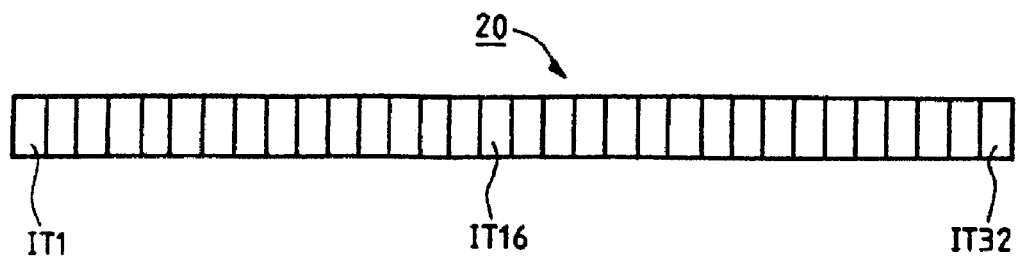

PRIOR ART FIG_3
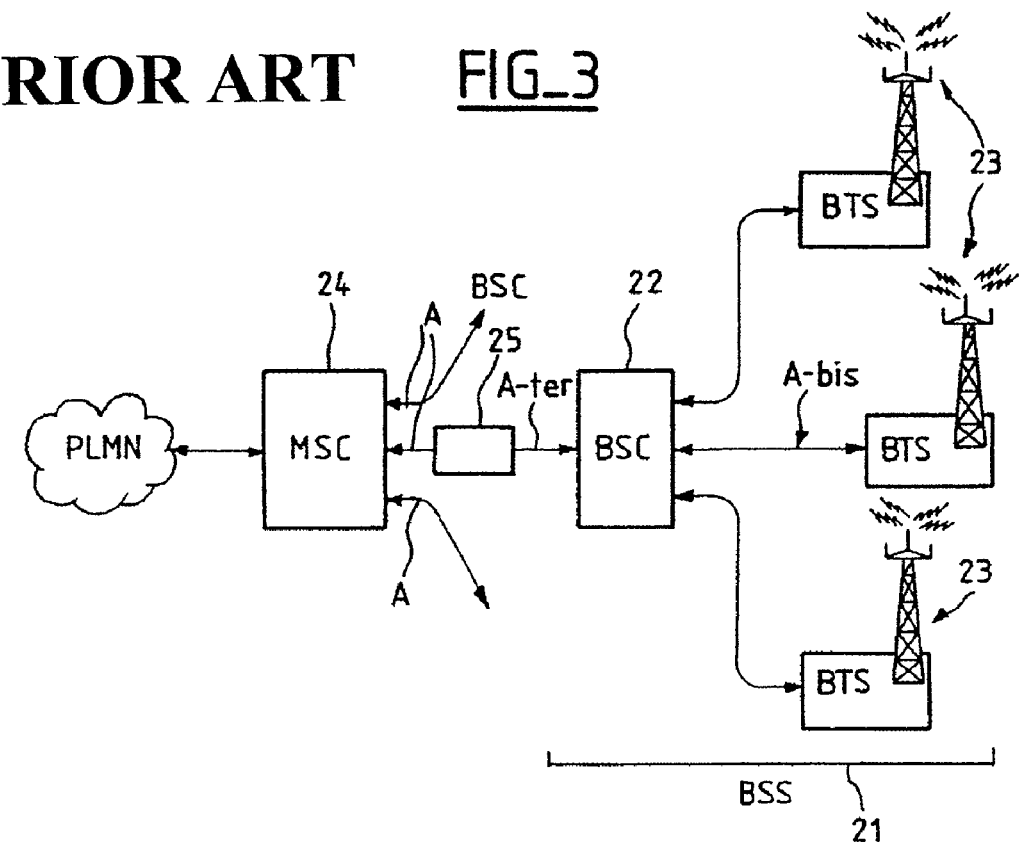
FIG_4
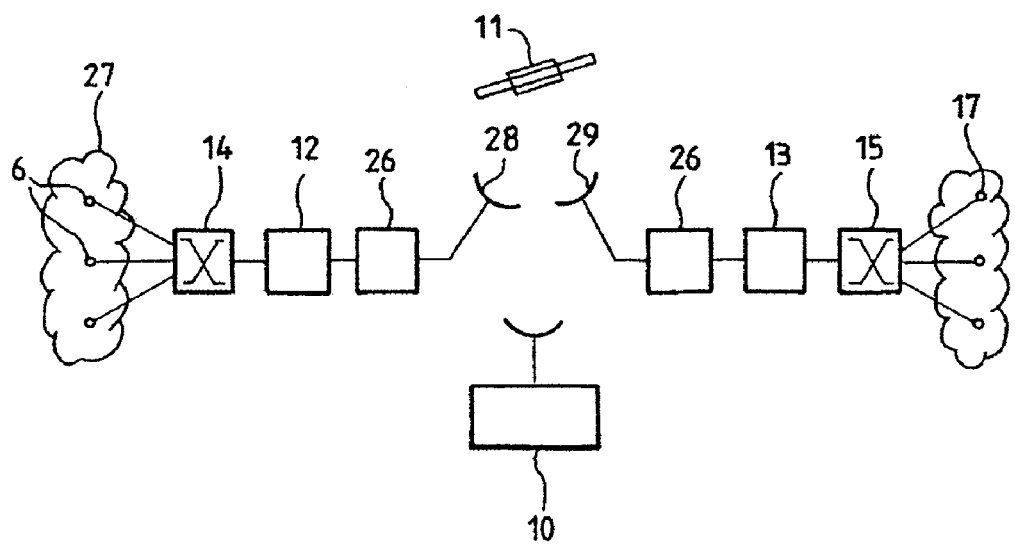

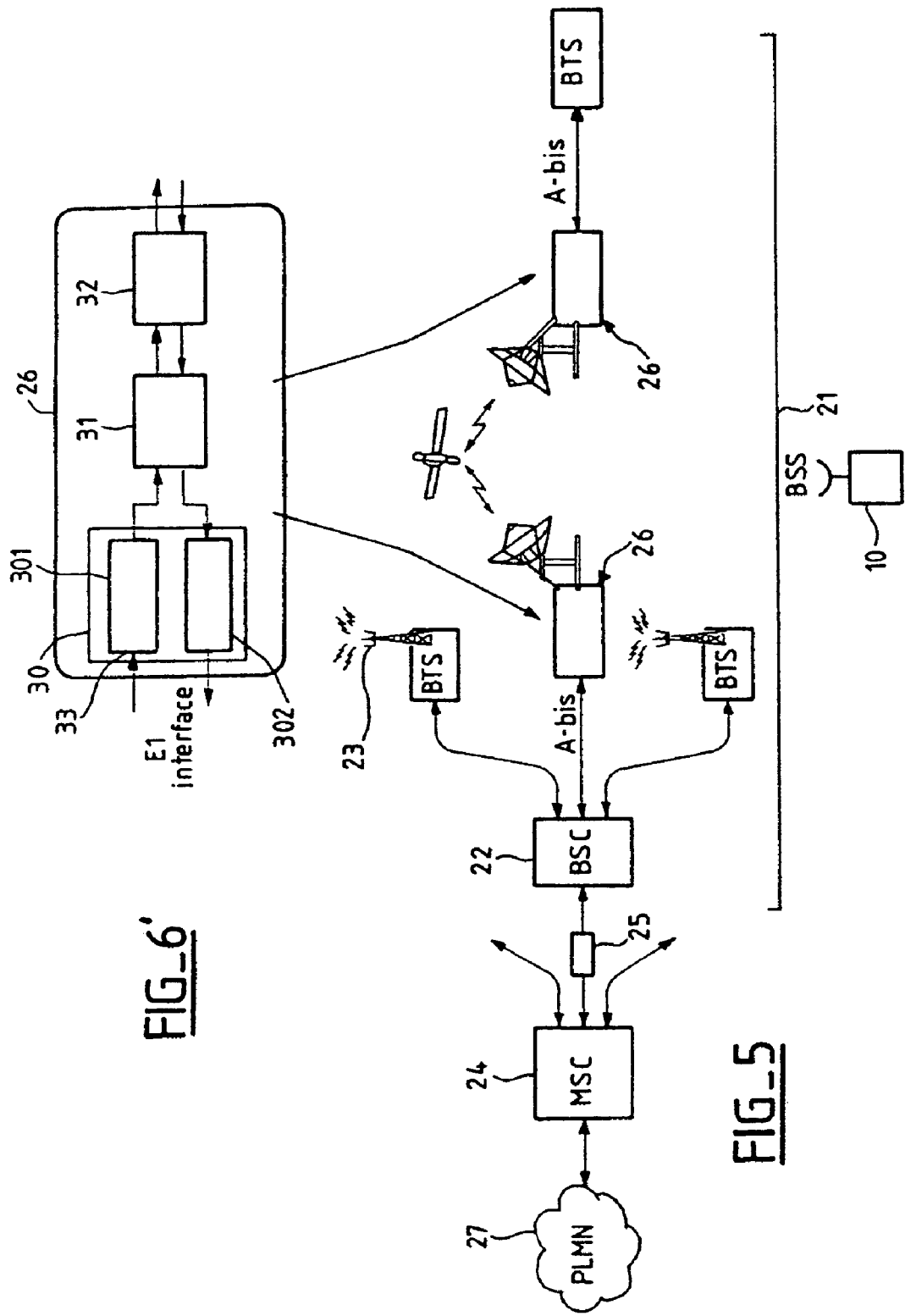

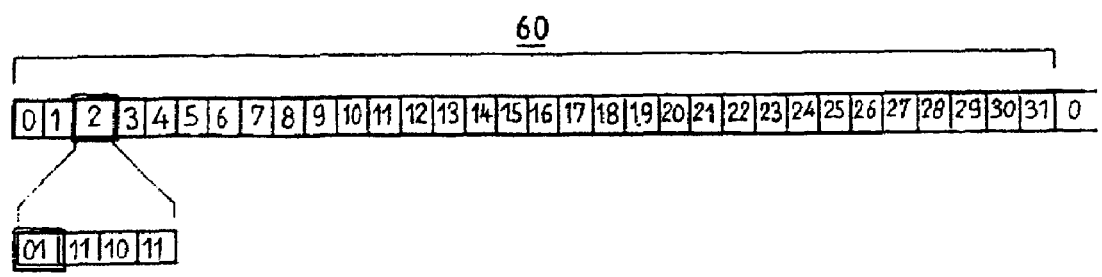
FIG_6
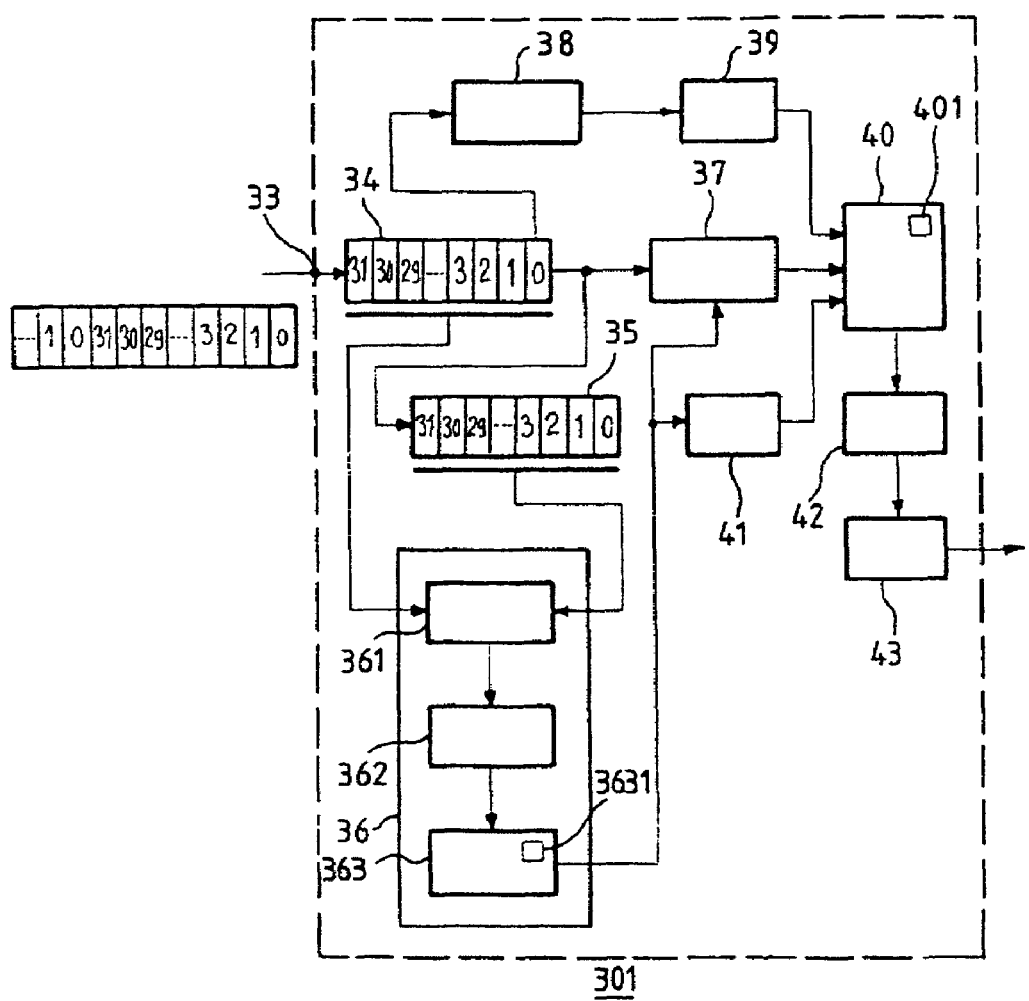
FIG_7

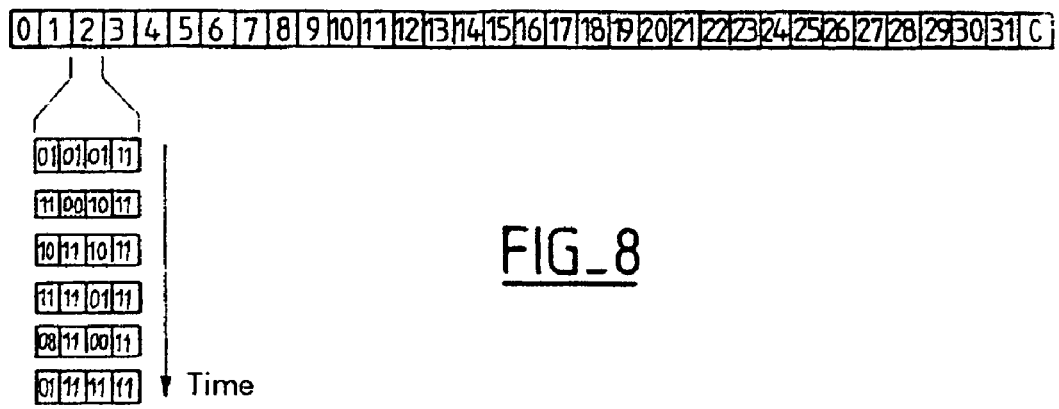
FIG_8
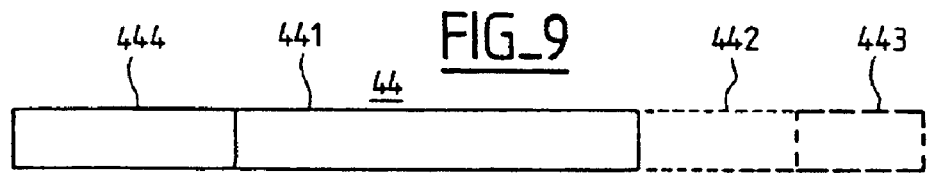
FIG_9
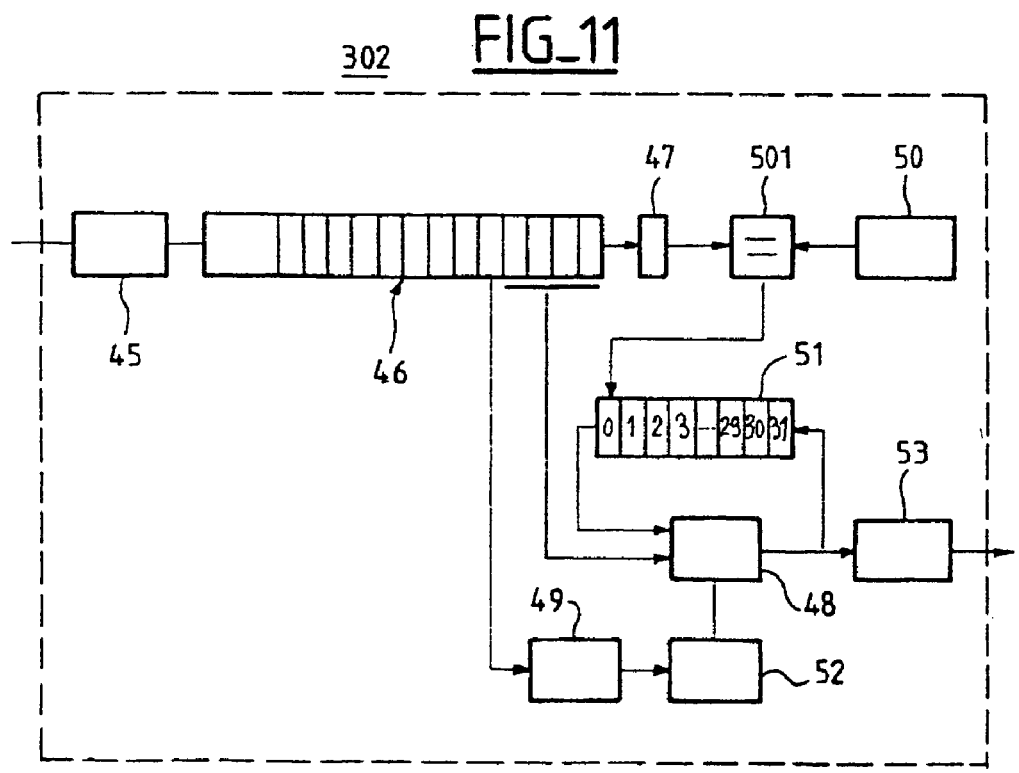
FIG_11

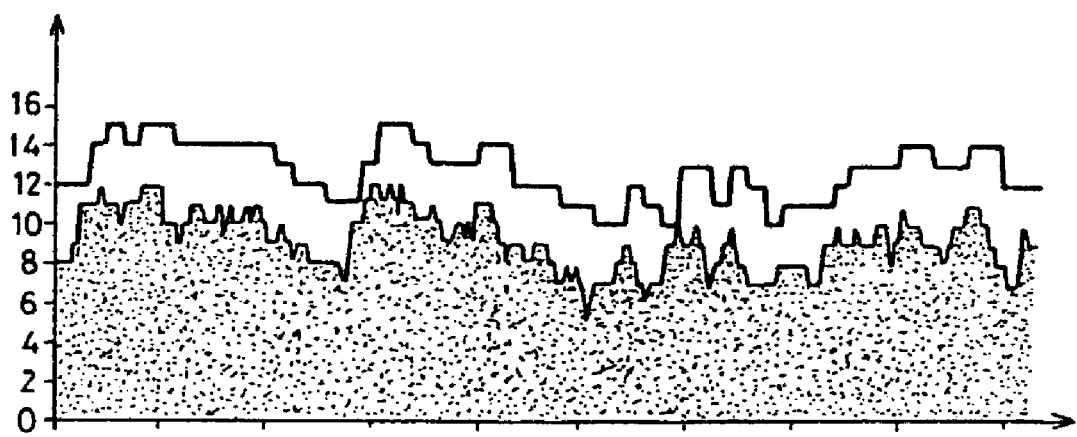
FIG_10

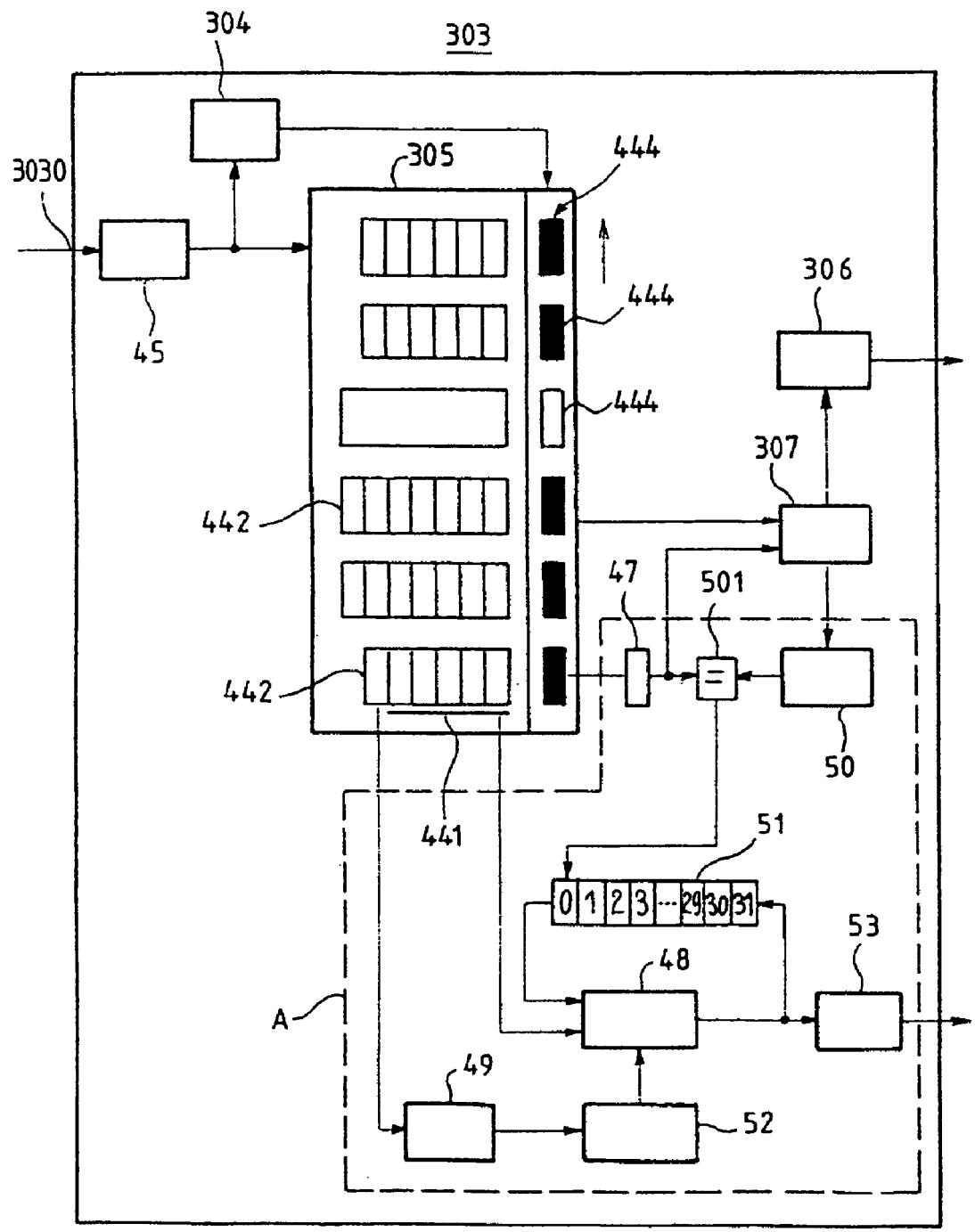
FIG_12

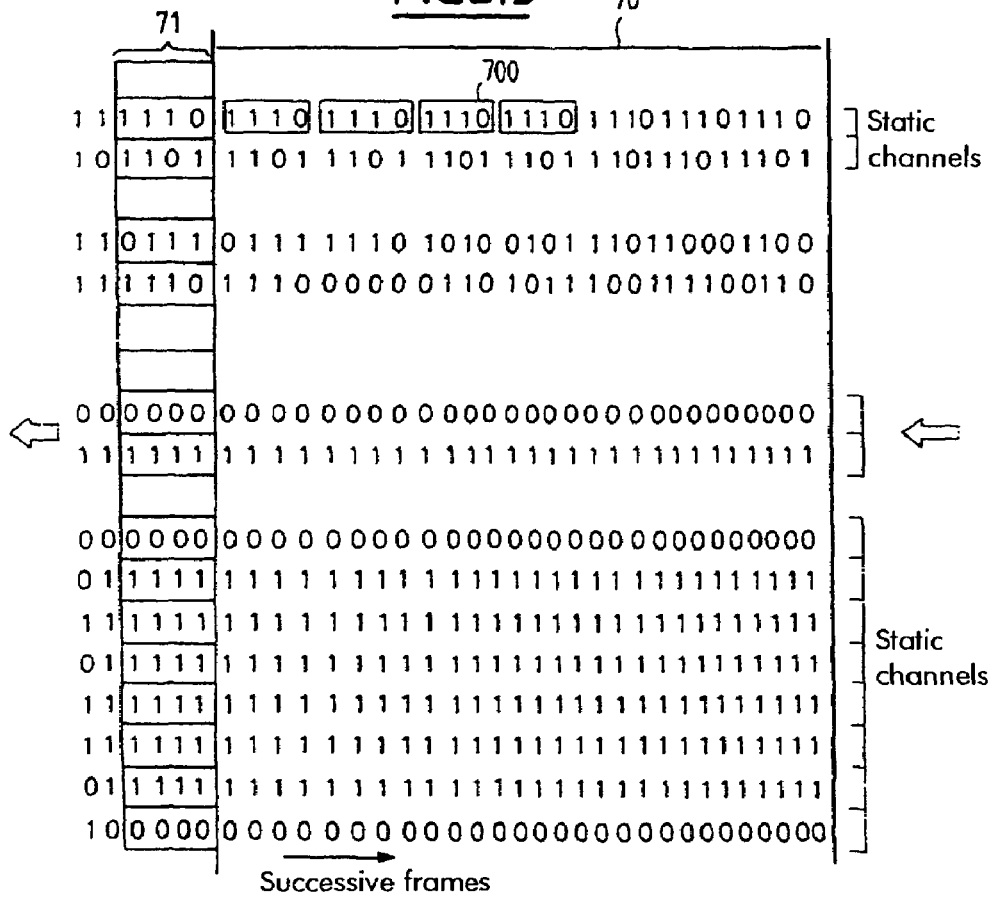
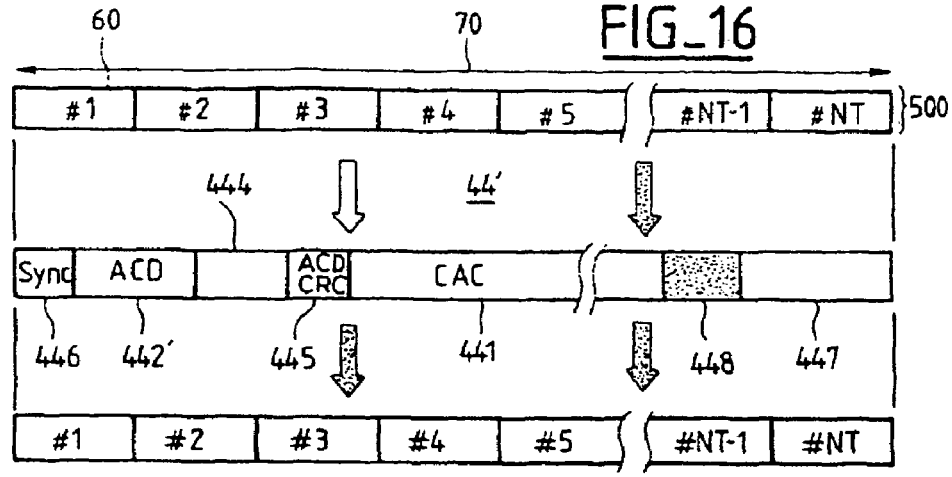

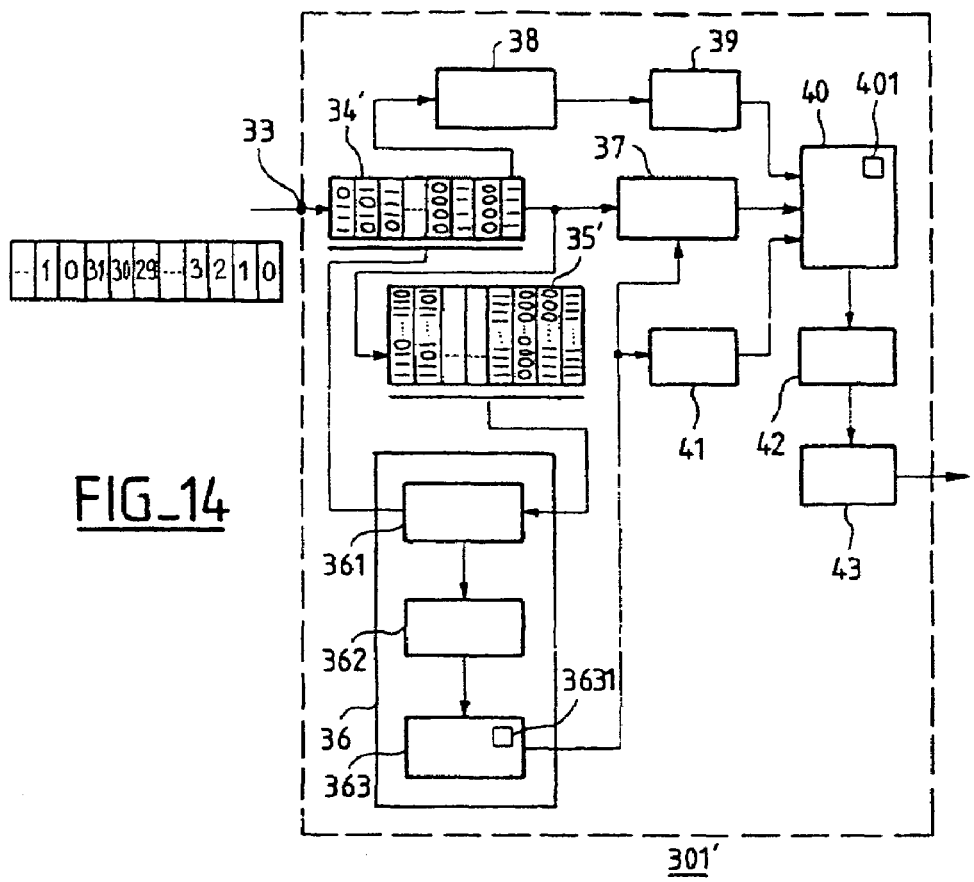
FIG_14
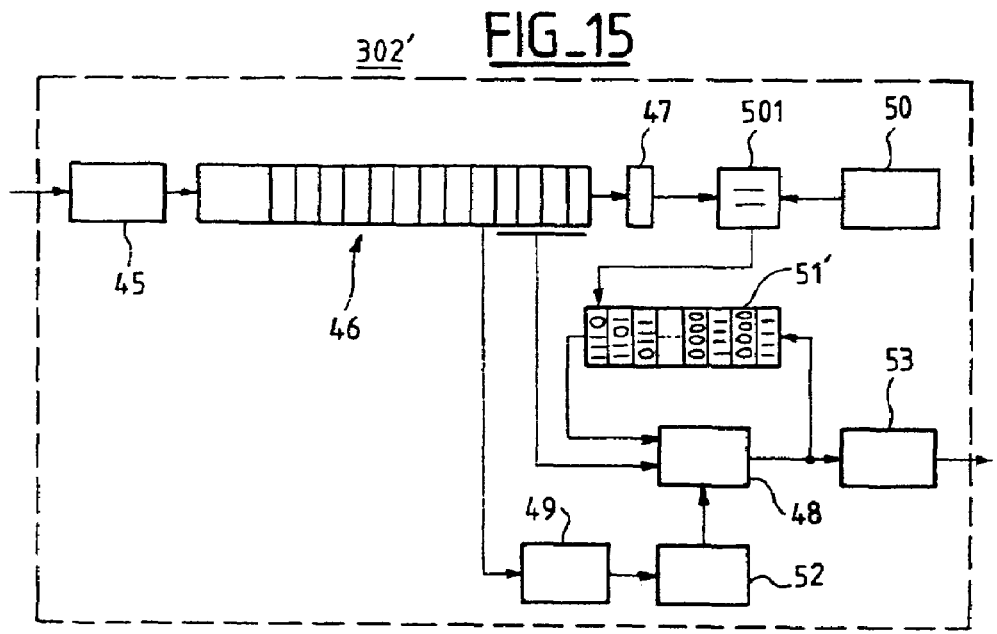
FIG_15

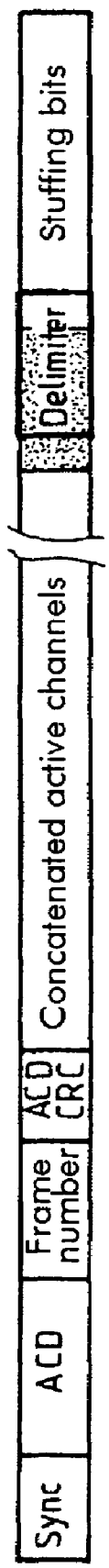
FIG_17a
FIG_17b

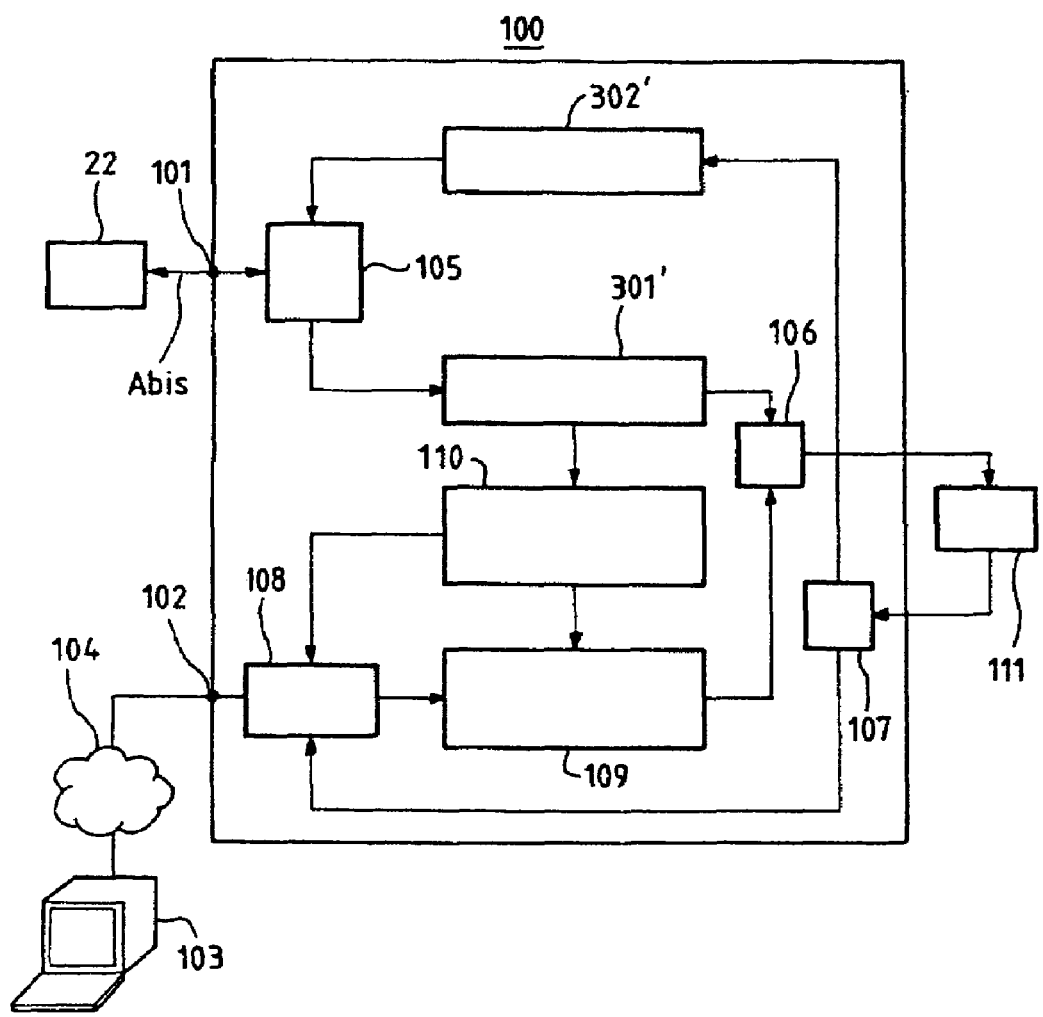
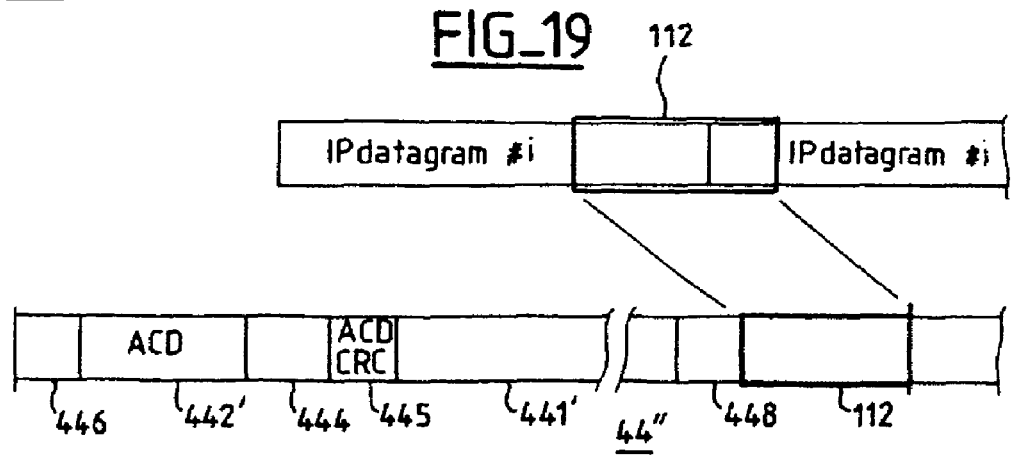

FIG_20
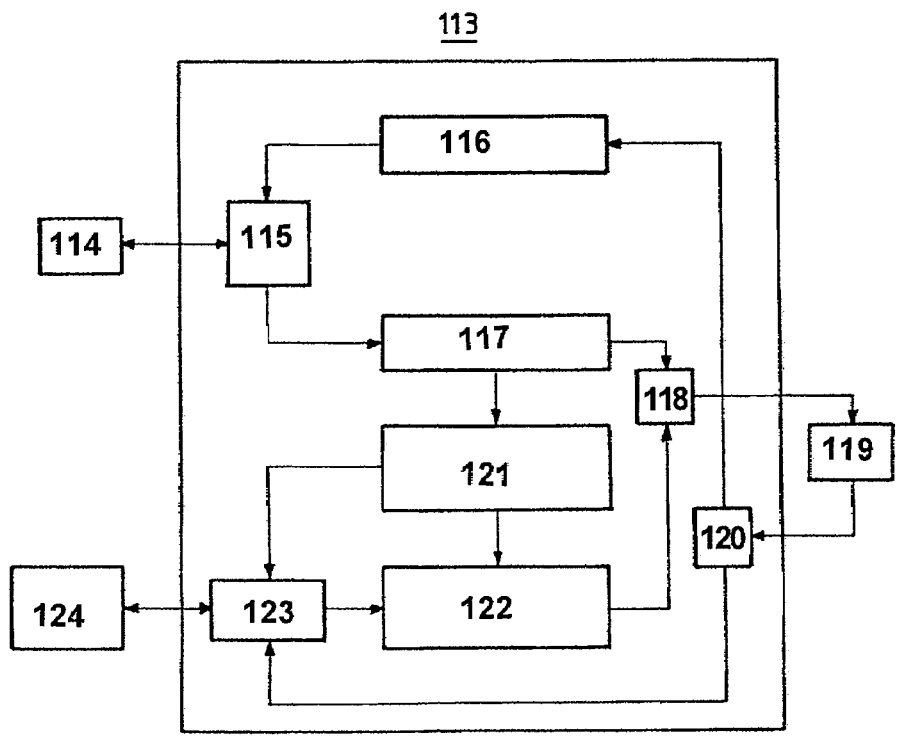
Legend
113 - demultiplexing device
114 - BSC
115 - E1 interface
116 - decompressor
117 - compressor
118 - formatting unit
119 - modem
120 - deformatting unit
121 - prediction unit
122 - memory
123 - port
124 - Ethernet network

MULTIPLEXING DEVICE, A DEMULTIPLEXING DEVICE, AND A MULTIPLEXING/DEMULTIPLEXING SYSTEM

BACKGROUND OF THE INVENTION

1. Field of the Invention

The field of the invention is that of telecommunications. To be more precise, the present invention relates to a device for multiplexing data packets, in particular IP data packets, with frames produced by a compression process.

The invention also relates to a demultiplexing device for reconstituting the data packets when decompressing frames.

The invention also relates to a multiplexing/demultiplexing system.

FIG. 1 shows a prior art satellite data transmission network which includes a satellite 11 and a communication resource management center 10 that communicates by radio with the satellite 11. Traffic stations 12, 13 comprising terminals operating in TDMA or SCPC mode also communicate with the satellite 11 and are connected to public or private telephone switching centers 14, 15, usually referred to as a public switched telephone network (PSTN) in the case of a terrestrial network. Each PSTN 14, 15 is connected to a plurality of users 16, 17.

2. Description of Related Art

Calls between users 16 and users 17 connected to different traffic stations are set up by the management center 10 which dynamically allocates transmission frequencies (in SCPC operating mode) or time slots of a time frame (in TDMA operation) as a function of connection requests from these users. This is known as demand assignment multiple access (DAMA) and this dynamic allocation of resources optimizes the use of satellite resources.

Thus satellite resources are assigned on demand; when a user requests a call, and if his request can be honored, a satellite channel is set up between the outgoing traffic station to which the requesting user is connected and an incoming traffic station to which the called party is connected. The management center 10 is also informed of the releasing of assigned resources at the end of a call.

The center 10 not only manages satellite frequencies but also the making available of modems in the outgoing and incoming traffic stations for setting up the telephone connections.

Operation is generally as follows:

In the SCPC mode of operation, the management center 10 assigns satellite frequencies when it detects line seizure by a user 16 or 17, that line seizure being manifested in an analog signal (at a particular frequency) or a digital signal (line seizure signaling bit or word) transmitted by the user to the management center 10 via the PSTN 12 or 13. The traffic stations 14 and 15 shape the signals sent by the users for transmission to the management center 10 via a modem.

One such frame is shown by way of example in FIG. 2. The frame 20 comprises 32 time slots IT1 to IT32, each of eight bits, of which the first time slot IT1 is dedicated to particular signaling and synchronization, the time slot IT16 conveys line signaling from the PSTN, and the other time slots are reserved for transmitting payload data (dialing, voice data, etc.) sent by the users for one transmission direction. The users constitute telephones, private branch exchanges or a public telephone network. Each frame has a duration of 125 µs and provides a communication bit rate of 2 Mbit/s.

FIG. 3 shows diagrammatically part of the infrastructure of a Global System for Mobile communications (GSM) network. It shows the radio subsystem 21 representing the base station system (BSS) managing the radio transceiver stations. A BSS comprises a base station controller (BSC) 22 and one or more cells and thus one or more base transceiver stations (BTS) 23. The BSC manages the radio resources of the BTS attached to it and the operation and maintenance functions of the base transceiver station. It autonomously executes handover of mobile stations moving around in its coverage area. Furthermore, as shown in FIG. 3, the BSC has two standardized interfaces, a A-bis interface with the base transceiver stations 23 and an A-ter interface connecting the BSC to a mobile switching center (MSC) 24 via a transcoder rate adapter unit (TRAU) 25. The purpose of this is to convert compressed voice at 13 kbit/s to digitized speech at 64 kbit/s in order to render the speech channels compatible with the MSC. Thus the MSC-BSC coupling is effected at a standard bit rate of 64 kbit/s on the MSC side and of 16 kbit/s on the BSC side, this bit rate comprising the bit rate of the compressed voice at 13 kbit/s plus an additional bit rate consisting of framing and stuffing bits. The interface between the MSC and the TRAU is called the A interface; the interface between the TRAU and the BSC is called the A-ter interface.

The TRAU 25 is compatible with the various signal types transmitted at the A-ter interface, and converts all these signal types to a bit rate of 64 kbit/s. These signals are essentially voice at 16 kbit/s (full rate) or 8 kbit/s (half rate) and signaling at 64 kbit/s or 16 kbit/s.

A time slot of a frame such as that shown in FIG. 2 can transport one 64 kbit/s channel, four 16 kbit/s channels, or eight 8 kbit/s channels, or a combination of channels at 8 and 16 kbit/s, or even at other sub-multiples of 64 kbit/s.

The MSC is the interface between the BSS and a cable network such as a public land mobile network (PLMN) 27. The MSC carries out all operations needed for managing calls involving mobile terminals. To obtain radio coverage of a territory, a mobile network switch controls a set of senders, which explains the presence in FIG. 3 of a plurality of A-ter interfaces with other BSS.

The A-bis interface providing the connection between the BTS and the BSC of the system is established via a synchronous interface E1 using G.703 frames (referred to as E1 frames). A portion of each frame carries payload data.

It will be noted that of a GSM network expansion via satellite, in particular as proposed hereinafter, is effected either at the A-bis interface or at the A-ter interface, or possibly at the A interface.

Regardless of which interface is selected for network expansion via satellite, the number of transmission channels used (time slots or subdivisions of time slots) is fixed and depend essentially on the physical configuration of the BSS (number of BTS, number of carriers). On the other hand, at a given time, only some of the transmission channels are active; the number of active channels depends on the signaling to be carried, the number of calls that have been set up, and on the inherent half duplex nature of dialog between parties.

To minimize the bandwidth required for the satellite communication for network expansion via satellite, the telecommunication system considered for the network expansion functions in DAMA mode, i.e. the satellite resources dedicated to the connection at a given time depend on the bit rate of the data to be transmitted, i.e. on the number of active channels within the frames to be transmitted.

The equipment enabling the DAMA technique to be used operates in two different modes:

either the equipment interprets signaling (for example SS7 signaling) to detect the activation of new transmission channels in order to adapt the assignment of transmission resources accordingly (variation of the band assigned for a given connection); in this case, the signaling is not standard signaling, and having the DAMA operate as a function of the signaling carried would be complicated and would depend on the equipment supplier, the A-bis interface between the BSC and the BTS not being standardized, or the equipment is at the Ethernet, ATM, or even Frame Relay interface; in this case, the DAMA process functions more simply, because it takes the average bit rate on the transmission channel as its base for adjusting transmission resource assignment. Note that in the present case the bit rate is invariant, because it is independent of the activity of the channels to be transmitted via the satellite, and is typically equal to 8×16 kbit/s per carrier transmitted by the BTS.

This second version of DAMA, based on measuring or detecting bit rate variations, is preferred because it avoids having to interpret the signaling carried at the remote interface in order to vary the satellite band assignment. However, because the network expansion interface is not directly compatible with the transmission equipment of the system, an intermediate device known as a transcoder is used.

A two-fold requirement is imposed for the transcoder: firstly, it must be able to extract from synchronous frames the payload data corresponding to active transmission channels, and only those channels, and then encapsulate them in Ethernet frames, IP packets or ATM cells. These elements are fed to the transmission equipment of the BSC, which can therefore offer the benefit of DAMA.

SUMMARY OF THE INVENTION

Moreover, the transcoder must also be able to restore synchronism at the end of the transmission system, in that the process introduced, based on extracting payload data from synchronous frames and encapsulation, completely breaks the original frame sequence. Consequently, the transcoder must be able to reconstitute the frames identically as they existed at the source.

To obtain the benefit of the DAMA functions offered by the transmission equipment, the E1 frames must be converted into Ethernet frames, IP packets, or an ATM stream. Prior art transcoders can handle E1-Ethernet or E1-IP adaptation, or E1-ATM adaptation if there is no compression of the frames E1 to be transmitted. Whether the frames E1 carry valid data or not, the resultant bit rate is constant; thus these transcoders cannot reduce the satellite bandwidth as a function of the effective activity of the GSM network transmission channels; the reason these transcoders ignore the real activity of the transmitted channels is associated with the fact that they constitute interface conversion solutions and do not analyze the content of the frame.

With the aim of eliminating the drawbacks cited hereinabove, the Applicant filed on Jun. 28, 2002 International patent application PCT/FR02/02252 entitled "Compresseur, décompresseur, bloc de données et procédé de gestion de ressources" ["Compressor, decompressor, data block and resource management method"], claiming priority from French patent application FR No 01 11 048. The above patent application (hereinafter referred to as INV1) discloses in particular a compressor for compressing data coming from input data frames. According to the invention, the compressor detects the bits (carrying a communication channel) that vary from one frame to another (are "active") and transmits only these in the data block. The block also contains a state code locating the "active" data in the original frame in order to be able to reconstitute it.

The compression process takes place within an analysis window that contains a fixed number of input frames (for example 16, 32, 64 or 128 input frames).

A channel is treated as non-active, or static, as soon as the same pattern, as regards its content, recurs periodically during the analysis window. For example, this kind of situation arises when, for a given channel, i.e. for a given bit, the pattern 1110 is reproduced by input frame groups in input frames. This pattern is identified as a reference pattern for the bit considered. If the analysis window contains 16 frames (has a length of 16 frames), for example, the pattern 1110 occurs four times in succession in the analysis window (i.e. there are four groups).

At the other end of the data compression system, each compressed data block is decompressed using an active channel descriptor inserted into the header of the block in order to restore the original structure of the input frames, by replacing each channel at the place it occupied before compression. In this way, N output frames identical to the input frames are reconstituted from a compressed data block; for the non-active channels, the decompression device functions by repeating the reference state all along the current window. The reference state for each static channel is obtained from a reference pattern that is transmitted periodically, for example between two data blocks.

French patent application FR 02 08 112 was filed on Jun. 28, 2002, entitled [lacuna] solving the problem of transmission errors of bits included in the groups of static bits of the analysis window.

The above solutions respond to the requirement of deploying Global System for Mobile communications (GSM) sites in areas where access for terrestrial transmission solutions is difficult. Satellite links can be implemented:

either at the A-bis interface, for base transceiver station backhauling, or at the A interface, for base station system backhauling, At present, cellular network operators in developing countries are seeking to use their network infrastructures to provide an Internet service.

They have acquired satellite communication systems providing the satellite backhauling function. It would be desirable to offer Internet access without impacting on the satellite communication system.

One solution would be to add an additional satellite link sharing the radio/antenna stages of the satellite communication system providing the backhauling facility, i.e. to add a dedicated carrier for handling Internet traffic in parallel with the GSM network traffic.

However, this solution impacts on the satellite communication system in that it necessitates hardware and software modifications.

The present invention proposes to provide a solution to the above objective based on the INV1 invention. As explained above, the INV1 invention relates to a device for multiplexing the traffic of a plurality of transmission links (the traffic comprising the payload data and the A-bis interface to A-bis interface signaling of GSM networks transparently).

To provide traffic compression at the A-bis interface, the activity of each GSM circuit is monitored and only traffic associated with active circuits is transmitted on the satellite link. This applies statistical multiplexing to the traffic of a plurality of satellite links connecting base transceiver stations and thus reduces the overall bandwidth requirement of the links.

Note that the bandwidth reduction factor increases with the number of links. Accordingly, the compression mechanism does not reduce the bandwidth in the case of a single satellite link, since it is necessary to cater for the maximum traffic and signaling hypothesis.

According to the present invention, the bandwidth that is not used by the A-bis interface traffic can be used for Internet traffic, which by definition is undemanding in terms of quality of service.

Thus the invention provides a device for multiplexing a first stream of data comprising a set of current data frames coming from a mobile telecommunication network with a second stream of data including IP datagrams coming from the Ethernet network, said frames having a structure defined by a plurality of time slots, each time slot of a first group of time slots being subdivided into a plurality of information bits carrying a respective communication channel, which multiplexing device is characterized in that it comprises:
- a compressor adapted to provide a compressed data block representative of the varying channels,
- the bandwidth assigned for a given transmission link being predetermined, prediction means for predicting the available bandwidth, known as the margin, taking account of the band occupied for the transmission of said compressed data block, and
- formatting means for subdividing and inserting at least one section of IP datagrams instead of the time space corresponding to the available bandwidth.

One embodiment of a device according to the invention comprises memory means for storing at least one IP datagram to prevent congestion of datagrams caused by short-term variation of the available bandwidth.

One embodiment of the compressor comprises:
- analyzer means for analyzing the active or static state of at least one channel in an analysis window of current frames, the active state, respectively static state, of said channel being assigned to it if comparing the content of said channel in the N bits compared between the N frames of a reference pattern comprising the N frames preceding the set of current frames with the corresponding N bits of the N frames of the analysis window shows a variation of the content for at least one of the bits, respectively a stability of the content for all the N bits, where N is an integer greater than or equal to 1,
- extraction means for extracting the content of the active channels of the analysis window as a function of the active states of the bits supplied by said analysis means,
- location means adapted to provide indications of the location of said active and static bits in the current frame as a function of the active and static states of the bits supplied by said analysis means, and
- grouping means for grouping at least one identifier of the current block, of the content of the active bits, and of their respective location within a data block to be sent.

The invention also provides a demultiplexing device, characterized in that, being adapted to demultiplex a compressed data block comprising a compressed block (ACD, CAC) and at least one IP datagram section, the demultiplexing device includes deformatting means for extracting the IP datagram sections and concatenating them in order to direct them to the Ethernet network and data decompression means adapted to reconstitute the active and static channels.

The invention further provides a multiplexing/demultiplexing system characterized in that it includes a multiplexing device according to the invention and a demultiplexing device according to the invention.

BRIEF DESCRIPTION OF THE DRAWINGS

Other features and advantages of the invention will become apparent on reading the following description of embodiments of the invention, given by way of non-limiting illustration, and examining the appended drawings, in which:

FIG. 1, already described, represents a prior art satellite data transmission network, FIG. 2, already described, shows a prior art frame fed to a traffic station from a switching center, FIG. 3, already described, shows diagrammatically a portion of the infrastructure of a GSM network comprising the radio subsystem, FIG. 4 shows a first embodiment of a satellite data transmission system according to the invention, FIG. 5 shows a satellite signal transceiver in a GSM cellular network infrastructure, FIG. 6 shows the frame structure to be transmitted at the A-bis or A-ter interface, FIG. 6' shows a signal transceiver comprising a compressor and a decompressor conforming to one embodiment of the invention described in the INV1 priority patent application FR No. 01 11 048 filed by the Applicant, hereinafter referred to as the INV1 priority application, whose content is incorporated into the present application, FIG. 7 shows a frame compression device conforming to one embodiment of the invention of the INV1 priority application, FIG. 8 shows the comparison principle conforming to one embodiment of the invention of the INV1 priority application for a given time slot of its content over a plurality of consecutive frames, FIG. 9 shows the structure of a block of data delivered by the restitution block of the compressor in one embodiment of the invention of the INV1 priority application, FIG. 10 shows the traffic variations at a traffic station for 16 simultaneous voice calls, FIG. 11 shows a device for decompressing blocks of data conforming to one embodiment of the invention of the INV1 priority application, FIG. 12 shows a variant of the FIG. 11 data block decompression device, FIG. 13 shows diagrammatically the operating principle of the compression method according to the invention of INV1, FIG. 14 shows one embodiment of the compression device according to the invention of INV1, FIG. 15 shows one embodiment of the decompression device according to the invention of INV1, FIG. 16 shows one embodiment of a compressed frame or compressed data block according to the invention of INV1, FIGS. 17a and 17b show error configurations occurring in the compressed frame of INV1, FIG. 18 shows a data multiplexing/demultiplexing system according to one embodiment of the invention of the present application, FIG. 19 shows a multiplexed data block according to the invention comprising compressed data multiplexed with IP datagrams, and FIG. 20 shows a demultiplexing device in a remote receiver terminal.

DETAILED DESCRIPTION OF EXEMPLARY EMBODIMENTS OF THE INVENTION

In this application, items having identical or equivalent functions carry the same reference numbers.

It will be noted that, notwithstanding the incorporation of the content of the INV1 priority application and of that of INV1, to clarify the background of the invention and because of their great interest, the invention of the present application is described only with reference to FIG. 18 onwards.

FIG. 4 repeats the components of the FIG. 1 telecommunication system. The system comprises two telephone switching centers 14, 15 each connected to a plurality of users 16, 17 and to a respective traffic station 12, 13. The switching centers supply 2 Mbit/s frames, as shown in FIG. 2, and are shown in more precise detail in FIG. 6, which relates to FIG. 5. Each traffic station 12, 13 is connected to a signal transceiver 26 connected to a respective satellite antenna 28, 29.

FIG. 5 shows how the device 26 fits into a GSM cellular network infrastructure. It will be noted that the device 26 can be included in the BSC 22 or even implemented at the A-ter interface.

The device 26 is shown in more detail in FIG. 6'. It includes a first input/output pair connected to the interface E1 connected to the BSC 22. This input/output pair is connected to a device 30 for compressing/decompressing frames that is described in more detail later. The device is also connected to a modem 31 for full duplex sending and receiving of time slots in the TDMA transmission mode. The modem 31 is connected to the input/output of a signal radio processor unit 32 connected to the respective antenna 28, 29.

The system further includes, as in the prior art, a resource management center 10 and a satellite 11 through which calls between the stations pass.

A first input of the device 26 is connected to a first input of the first pair of the device 30 connected to an input of a device 301 for compressing frames and supplying an output signal at a first output of the device 30 to the modem 31; a second input of the device 30 connects the modem to a device 302 of the device 30 for decompressing frames delivering a decompressed frame signal to an output of the device 26 connected to the BSC. Hereinafter, for conciseness, the device for compressing frames will be referred to as a compressor and the device for decompressing frames will be referred to as a decompressor.

The compressor 301 compresses frames to be transmitted and adapts the format of the resulting blocks of data to the interface offered by the modem 31 in sending mode, namely an Ethernet, IP or ATM interface.

The decompressor 302 handles adaptation to the interface offered by the modem 31 in receive mode (which is generally identical to that used on the sending modem side) and reconstitution of the frames supplied to the input of the compressor.

FIG. 6 shows the typical structure of a frame 60 to be transmitted at the interface A-bis or A-ter of GSM cellular networks. It will be noted that the present invention is not limited to this kind of interface and encompasses any other type of interface, in particular those relating to non-cellular networks.

Each frame is divided into a fixed number of time slots, in this instance 32 time slots for E1 frames conforming to the ITU-T's G.703/G.704 recommendations, each time slot carrying one byte. The time slot 0 is reserved for synchronizing the transmission of frames, with a view to synchronizing the reception of frames at the destination equipment end. The frame frequency is generally 8 kHz, conveying 31×64 kHz channels, at the rate of one channel per slot.

In the present context of extension of cellular networks via satellite, each byte breaks down as follows:

- each byte comprises 4 nibbles (each consisting of a sample on 2 bits), and each nibble carries one 16 kbit/s channel; this is the case in particular for the transmission of the 16 kbit/s compressed channel at the A-bis and A-ter interfaces;
- each byte transports eight half rate compressed voice channels, and each bit therefore corresponds to one voice channel;
- the byte is not subdivided, which is the case transmitting data using the General Packet Radio Service (GPRS), using 64 kbit/s user data channels, or for transmitting signaling;
- other, alternative forms can exist: for example two 32 kbit/s channels or one 32 kbit/s channels plus two 16 kbit/s channels, etc.

FIG. 7 shows a compressor 301 conforming to one embodiment of the invention of the INV1 priority application.

The operation of the compressor is described hereinafter:

In a first time period, it extracts the content of each frame. For this, it synchronizes to the reference time slot 0 and extracts the data present in the subsequent time slots.

It then compresses the extracted data within the frame. This process depends on the structure of each time slot. Two approaches to this are envisaged:

- either the structure of the frame (number of time slots used and their position in the frame) and the structure of each time slot are defined by a configuration procedure: four 16 kbit/s channels (nibble structure), then eight 8 kbit/s channels (bit structure), then one 64 kbit/s channel, etc.,
- or the compressor determines the structure of each time slot for itself by means of a learning process, through statistically analyzing the evolution of each bit and correlating it with the evolution of adjoining bits, in order to identify correlations in the changes of state; it is agreed that the configuration of the structure of the frames transmitted generally does not evolve, and that a learning procedure can therefore be used to avoid having to configure the compressor as a function of how it is used.

FIG. 7 shows a device 301 for compressing frames conforming to one embodiment of the invention of the INV1 priority application. The compression principle used by the compressor is the following: the structure of the time slot being known, the compressor compares the content of the slot of the current frame to the content of the same slot in the preceding frames. This principle is shown diagrammatically in FIG. 8, which shows the comparison principle for the reference time slot 2 and over a time period of six frames.

The data frames enter via the input 33 of the compressor 301, which is connected to the input of the first input/output pair of the device 26. This input 33 is connected to a frame buffer 34 for storing the current frame and operating in accordance with a First In First Out (FIFO) logic. The output of the buffer 34 is connected to an input of a memory 35 for storing the frame preceding the current frame present in the memory 34. The output of the memory 34 is also connected to an input of an analysis unit 36, which input is connected to a comparison unit 361 in the unit 36. Thus the unit 361 is adapted to compare the current frame with the frame preceding it, which it receives at a second input connected to an output of the memory 35. The analysis unit 36 further includes a unit 362 for detecting state variations whose input is connected to the output of the comparison unit 361 and a state machine 363 connected to the output of the detection unit 362 and adapted to determine the active or static state of each of the elements transmitted (for example each of the nibbles transmitted), as described hereinafter. The output of the memory 34 also feeds the current frame to the input of an active element extractor 37 whose input is connected to the output of the state machine 363 of the analysis unit. The output of the state machine is connected in parallel to a state encoder 41 adapted to supply compact active element position identification codes, systematically in operation or on detection of a change of activity state of components of the frame. Finally, the output of the memory 34 is connected to the input of a frame synchronization unit 38 whose output is connected to the input of a frame counter 39. The counter 39 delivers a number specific to the current frame to a first input of a data regrouping unit 40 for constructing blocks of data grouping data specific to the current frame. The number supplied by the counter 39 identifies the current frame. A second input of the grouping unit 40 is connected to the output of the extractor 37 and a third input is connected to the output of the encoder 41.

The grouping unit 40 constructs a block of data using a method that will be described in detail hereinafter and its output feeds the data block to an output buffer 42. A plurality of blocks are preferably concatenated in the memory 42 before transmission to a physical output interface 43 of the compressor 301 handling the adaptation to the type of interface used for the coupling with the sending modem 31 (Ethernet, IP, or ATM).

The compression method used by the compressor includes the following steps:

The analysis unit 36 analyzes variations in the content, based on the structure of the frame established by the configuration procedure in the example described here (for example nibble by nibble for a frame structured in nibbles), and detects state variations. This is done within the analysis unit by comparing each nibble with the corresponding nibble in at least the preceding frame, the result being supplied to the detection unit 362, which detects and supplies active or static activity states to the machine 363, according to whether there has been any variation in the state of the nibble or not. If a nibble does not vary a fixed number of times, for example three times (which number of times can be much higher, and is configurable in the state machine 363), the state machine 363 informs the unit 40, via the state encoder 41, that the content of this nibble is no longer being updated; the nibble is then considered as being in the static state. The compressor then stops the transmission of the nibble concerned.

Conversely, as soon as a nibble changes state after it has been detected as static, the transmission of its content resumes without delay, the state machine transmitting a compact code for activating the state of the nibble to the unit 40 via the state encoder.

The codes which are transmitted to the unit 40 are representative of variations in the state of the elements (the nibbles in this case) and are a function of the structure of those elements. According to one convention (which can obviously be reversed or modified), within a stream of bits representing the state of the elements transmitted, a 1 signals that an element is active and a 0 signals that an element is static; for example, for a pair of consecutive time slots each transporting four nibbles, the following code combination could apply: 1010 1111 (AF in hexadecimal). This sequence is representative of six active nibbles and two inactive nibbles (those assigned the code 0). The code indicative of a change of state is transmitted without delay immediately an element of the frame goes from the static state to the active state.

In order not to overload the frames transmitted with change of state signaling, a time-delay is implemented for indicating a change of one or more elements from the active state to the static state. On the one hand, the compressor has access to a preprogrammed memory 3631 of the state machine 363, which counts at least three frames (for example) to verify that the element considered is identical over the three frames, but additionally the buffer 42 of the compressor holds at least N frames relative to the preceding change of state indication; this spreads out the change of state signaling and prevents overloading the connection.

Conversely, as soon as an element changes from the static state to the active state, the state machine is programmed to transmit the change of state of the frame code immediately.

The change of state code of the frame, or state code, includes all the state codes of the elements carried by the frame, only for the time slots used, these state codes being generated by the method defined above.

For example, for a frame used to transport two time slots, the code 00AF delivered by the encoder signifies that all the elements of the first time slot are static whereas those of the second time slot are active except for nibbles 2 and 4 (this is above example 1010 1111). Thus the change of state code, called the state code hereinafter, serves as a location indication for the active elements of the frame. This state code is supplied by the encoder 41 in the state information at the output of the state machine.

Consequently the nibbles can have two mutually exclusive stable states, respectively static or active, and therefore the grouping unit transmits only the nibbles that have been signaled to it as active, adding stuffing bits to complete the block of data as a function of the constraints of the interface used. These stuffing bits are managed by a stuffing bit manager 401 internal to the grouping unit. The stuffing bits are explained in more detail hereinafter. It will be noted that instead of useless stuffing information, it is possible to use this space in the frame to repeat data critical to the efficient reconstitution of frames, such as the state code or the frame number.

FIG. 9 shows the structure of a block of data 44 delivered by the grouping unit 40 of the compressor. The block 44 comprises a block 441 of compressed data including the nibbles to be transmitted and a state code of the current frame, for example 00AF. This state code is representative of the position of the active elements within the frame considered.

To signal a change of state to the decompression device at the other end of the transmission system (which decompression device is explained hereinafter), the compressor adds to the state code of the current frame, for example 00AF, via the encoder 41 or the unit 40, a specific code 443 signaling the presence of a state code 442 within the block, which signifies that the data block transmitted corresponds to a change of state. In a variant, specific codes as specified hereinabove accompanying the state code of the current frame are not added, but the decompressor detects the addition of the state code by analyzing the length of the block of data received. As soon as the block has a different length, the decompressor can deduce that a state code is present at the end of the block.

Moreover, a frame number 444 is added at the head of the block of compressed data, to guarantee synchronization of the decompression of the data and the taking into account of loss of data block situations in the transmission system. This frame number is counted modulo the capacity of the counter used for this purpose (for example 8 bits or 16 bits).

The resulting data block is encapsulated in the Ethernet frame, the IP packet, or the ATM cell, as a function of the transmission mode adopted.

A plurality of blocks are preferably concatenated in the buffer 42 before encapsulation in order to reduce the bit rate overhead associated with encapsulation.

The physical output interface 43 handles the adaptation to the type of interface used for the coupling with the sending modem (Ethernet, IP, ATM).

It will be noted that the advantage of choosing the Internet Protocol (IP) over Ethernet is that it allows the inclusion of optimized routing functions and automatic rerouting functions in the event of an error on a connection.

There follows a more detailed explanation of the benefit of the stuffing bits referred to hereinabove. To this end, FIG. 10 shows the variations in traffic at a traffic station for 16 simultaneous voice calls, allowing for periods of silence. These variations follow a statistical profile: the probability of the 16 channels being active simultaneously is very low, and likewise the probability of the 16 channels being simultaneously silent; on average, eight of the 16 channels are active.

Because the compressor is connected to a satellite transmission system including a DAMA function, satellite resources are assigned at a slow rate, for example every 1.6 seconds, although during those 1.6 seconds a number of parties will go from being silent to speaking, although there will not necessarily be as many who go from speaking to silent, which explains the supplementary margin of almost 50% between the assignment of channels by the system to the traffic station considered and the channels effectively used at the latter. Because the resource assignment system cannot usually allow for a margin automatically, the compressor adds margin bits to simulate surplus occupation of transmission resources relative to its actual requirements. The supplementary bits not used to transmit payload data are used to impart redundancy to the most critical information, for example a state code or a frame number. On the other hand, immediately the decompression device has to transmit more elements than in the preceding cycle, it uses the margin bits to transmit them, to the detriment of transmission of redundant information, the status code signaling which new elements are active. This process based on the use of significant margin bits smoothes the load of the link used and therefore adapts the compression/decompression device according to the invention of the priority application (INV1) to the inertia of the resource assignment mechanism used in the conventional way, whilst preventing transmitting bits of no utility. It is to be noted that the shorter the resource assignment cycle, the smaller the margin can be. If the margin is reduced to the point that it is not possible to transmit a state code or a complete frame number, an advantageous solution consists in multiplexing this redundant information over a plurality of consecutive blocks of data, spacing the cyclic repetitions of this information by a repetition boundary indicator, and considering the information multiplexed in this way to apply to the block carrying the repetition boundary indicator.

The role of the DAMA function being to assure dynamic sharing of the band assigned as a function of the current requirements of each station, concerning N stations with a balanced current traffic, with the aim of simplification, with 16 calls at each station, a considerable statistical multiplexing gain is achieved if N is relatively high (at least 10).

If N=1, the resources reserved for the 16 calls are strictly equal to the handling of the 16 calls, i.e. 16×16 kbit/s (a call necessitating 16 kbit/s at the A-bis interface). On the other hand, for a high value of N (greater than 10), the ideal case is approximated, which corresponds to the theoretical sufficiency of the 50% reservation of the total band for a station, i.e. 8×16 kbit/s per station, or 10×8×16 kbit/s for all of the ten stations in a given direction, this quantity having to be doubled for both directions.

Rather than establishing a static reservation of resources for each station, resources are assigned dynamically.

With the compressor/decompressor according to the invention of the INV1 priority application, the function for detecting the activity of the nibbles is used to inform the resource management center 10 of the current requirements of the stations. In this example resources are assigned every 1.6 seconds and the current assignment of resources is based on the traffic statistics of the preceding 1.6 seconds cycle.

On the basis of this information on current requirements supplied by the compressor/decompressor according to the invention of the INV1 priority application, the resource center artificially increases the size of the packets transmitted by adding supplementary bits to each packet transmitted to have a sufficient resource margin.

For example, if the current requirement of a station is to transmit 50 bytes every 2.5 ms, 10 supplementary bytes are added, for example, so as not to lose nibbles in transmission if the number of active nibbles detected increases by 20% before the next assignment of resources. If this precaution of reserving a supplementary margin is not taken, the sending modem used for the transmission becomes saturated and rejects surplus packets (relative to the transmission capacity assigned to it for the current cycle) that it is not able to transmit.

The information of the supplementary bits forming said supplementary bytes that complement the transmission packets can be of two types:
   either stuffing information, which is not pertinent to the transmission of data, and only intended to provide a bit rate margin for the reasons cited above,
   or payload information, intended to repeat the data that is most critical for transmission: state code, frame number and possibly header bits.

Both types of information may be combined.

It will be noted that repeating the state code may prove highly pertinent in that the loss or incorrect reception of the state code by the destination equipment could disturb the frame reconstruction process, which would be reflected in an offsetting of the nibbles within the reconstructed frame.

The process just described is referred to as level 1 compression. Level 2 compression complements it, using identical signaling and a state code analogous to the state code described for level 1. It functions by identifying the type of content conveyed by the transmission channel considered. For a 16 kbit/s compressed channel, each call is time-division multiplexed at the rate of one nibble per frame. The time-division multiplexing is itself structured in frames, for examples frames of 320 bits every 20 ms. During a call, each party is alternately active or silent. In a manner that is not specific to the device considered here, during periods of silence, the transmission of frames continues but an indicator in the frame shows that the frame is not active. Level 2 compression uses this indicator to suspend the transmission of data relating to compressed voice and to transmit only the payload elements of the 320 bit frame. During the transmission of payload information, the bit corresponding to the position of the element considered in the input frame of the compression device is active within the level 2 state code, and the bit is reset to the inactive state as soon as the payload information has been transmitted. This process increases the effectiveness of the level 1 compression device through extending it to interpret non-static elements including non-payload data.

FIG. 11 shows in a detail a decompression device or decompressor 302 conforming to one embodiment of the invention of the INV1 priority application. An input connected to the receiving modem 31 is connected to a physical interface 45 handling adaptation of the frames (Ethernet, IP, or ATM) to the format of the compressed data blocks using the compression method already explained.

The output of the interface 45 is connected to the input of an FIFO buffer register 46 storing the received blocks of data.

A first output of the register 46 is connected to an extractor 47 for extracting a frame number 444, a second output is connected to means 48 for inserting active elements of the current frame, and a third output is connected to a state code detector 49.

A frame counter 50 internal to the decompressor is initialized when the connection is set up, with a negative offset relative to the number of the received frame. This is intended to prevent a famine caused by the frames received being delayed relative to the value of the counter.

A comparator 501 compares the value of the number of frames in the extractor 47 and the counter 50. If the value of the counter is identical to the frame number associated with the block present in the buffer register 46, the comparator commands a memory 51 containing the preceding frame to deliver it to an input of the inserter means 48.

The state code detector 49 detects the state code associated with the received block of data and feeds it to the input of a state register 52 whose output is connected to another input of the inserter means 48.

Finally, the memory register 46 delivers the block of received data to a third input of the inserter means 48. Thus, if the frame and frame counter numbers are identical, the inserter means 48 reconstitute the current frame from the repeated preceding frame in the memory 51, replacing the elements signaled as active by the values contained in the block of received data, and on the basis of the information signaling the positions of the active elements delivered by the state register 52.

The reconstituted frame is then delivered to a physical interface 53 handling the adaptation of the blocks of data to the format of the frames at the A-bis interface.

Particular attention must be given to the fact that the spirit of the invention of the INV1 priority application can be extended to higher data levels, as explained hereinafter:

the data carried in the frames to be compressed is generally itself encapsulated in frames with a proprietary or non-proprietary format. The compression/decompression method can be extended, in accordance with the same principle, to compressing data within frames. The objective of such extension is to introduce an even higher compression gain by eliminating all superfluous data.

One example of this is the encapsulation of a 9.6 kbit/s user voice channel into a 16 kbits frame by adding synchronization, stuffing and signaling bits. The additional compression method is adapted to eliminate the synchronization and stuffing bits and to retain only the signaling bits (state codes, etc.), which have a dynamic character, in the sense given previously by the detection of active elements.

The synchronization of the reconstitution of the original frames by detecting the boundary between the transmitted blocks of data is implicit.

Of particular benefit is the embodiment of the compression/decompression method according to the invention of the INV1 priority application as described hereinafter, consisting in an automatic change to non-compressed mode:

The bandwidth improvement is evaluated continuously. Immediately the bit rate of the average output flow of the nibble compressor exceeds that of the average input flow, the compression device is bypassed, synchronously with a frame boundary, and an indicator is transmitted to the decompressor to deactivate the decompression mechanism on the decompressor side. Conversely, immediately the average compressed flow relative to the incident flow falls below a particular threshold, the compression/decompression device is reactivated.

The threshold is intended to prevent untimely switching from compressed mode to uncompressed mode, in particular if the load in terms of the frames to be transmitted is close to saturation.

To avoid any disturbance of the satellite link that could be reflected in a loss of information, the information transmitted being degraded, or even interference information being added, leading to interference with the reconstitution of frames, the following provisions are considered, and can be applied individually or in combination:

automatically changing to uncompressed mode as soon as the quality of the connection becomes critical (which involves monitoring the $E_b/N_0$ or the BER) and/or using error detection based on the CRC associated with each Ethernet frame, for example, adding cyclic redundancy check codes to the most critical information, in particular the state code, to achieve correct recovery of that information, repeating the state code, systematically transmitting the state code as soon as the quality of the connection falls below a particular threshold or immediately an error is detected (frame number sequence error or CRC error), sending the state code at a fast rate if the quality of the connection is degraded, monitoring the frame number associated with the received block of data, to detect sequence breaks related in particular to a frame loss, and analyzing the next frame number to correct a transient frame number error.

The prior art Intelsat Business Services (IBS) frame used for satellite transmission has the type of frame structure shown in FIG. 6. IBS frame transmission is very widely used, as it offers the possibility of transmitting N×64 kbit/s, where N is established as a function of the actual requirement of the network operator. However, IBS modems do not integrate a function for dynamically varying the bit rate of N×64 kbit/s as a function of the content to be transmitted.

In one embodiment, the compression device 30 divides the traffic between two or more of its outputs, each output offering a fixed bit rate, activated as a function of the resulting load after compression by the compressor 301 in the method described above. Immediately the compressed bit rate exceeds the bit rate reserved on the first channel, for example 5×64 kbit/s, a portion of the traffic is offloaded onto a second channel, for example at 2×64 kbit/s, and immediately that second channel is saturated in turn, the second channel is switched to a third channel, for example at 4×64 kbit/s, and so on, switching the surplus traffic between the channels 2 and 3 without interrupting transmission but offloading the traffic from the permanent channel to the resulting additional channel.

At the receiving end, the original frames are reconstituted by concatenating the blocks of data received via the main channel and the additional channel.

FIG. 12 shows a variant 303 of the decompression device 302 from FIG. 11 that can also and advantageously be used in any public or private IP network. The advantageous functions in this case are: data compression/decompression at levels 1 and 2, frame number addition, decompression with resynchronization of frames at the output, and specific processing in the event of non-reception of the compressed frame at the time at which it should be reconstituted.

The data blocks 44 enter the decompressor 303 via an input 3030. A frame number extractor 304 extracts the numbers of each frame for identifying them. The blocks 44 are fed to a memory (305) for storing the blocks of data. FIG. 12 shows six blocks of data characterized by their frame number 444, each represented by a solid block. The first box of each block represents the state code 442 of the block and the subsequent boxes correspond to the compressed data 441.

In FIG. 12, a dashed line A surrounds in particular the part common to FIG. 11 for reconstituting the original frames. This has been described and explained already, and will be described again here.

Furthermore, the device 303 comprises a counter initialization circuit 307 receiving the number of the current frame and the number of blocks of data stored in the memory 305.

When the decompression device is initialized, the circuit 307 initializes the counter 50 and synchronizes it to the first frame number received by the decompressor.

Furthermore, synchronization by the initialization circuit is repeated on repeated detection thereafter of discrepancies between the frame numbers received and the current output of the counter.

Operation is as follows: the decompressed frames are intended to be retained in the memory 305 of the decompression device for as long as the frame respective numbers associated with them are not identical to the frame numbers delivered by the local frame counter, allowing for a negative offset to provide some flexibility in the reconstitution of frames and to compensate time fluctuations induced by the transmission system, which often occur in satellite transmission or in terrestrial networks, especially IP networks, although the frames are supposed to be reconstituted at a constant and unchanging rate. Immediately a situation of identity arises at the comparator 501, the frame for which that identity has occurred is fed to the output of the decompression device.

If no frame corresponds to the number of the frame to be reconstituted at the output of the decompression device, the preceding frame is repeated and/or an error code is generated by a generator 306 for signaling the absence of frames to a telecommunication system management center, not shown.

If the error consisting of the non-identity of the current frame number and the frame number delivered by the local frame counter of the decompression device is repeated over a plurality of consecutive frames, the local frame counter is resynchronized to the frame identifiers received.

The negative offset applied at the output of the frame counter is intended to establish a margin covering the range of time fluctuations induced by the satellite transmission system.

The FIG. 12 block diagram shows that, instead of using an FIFO like that used in the FIG. 11 embodiment, a buffer memory is used to reschedule the received blocks of data on the basis of the block number associated with each block of data (the number indicated in the filled in boxes), the initialization circuit initializing the counter on start-up or each time that a repetitive sequence break occurs.

The local counter is initialized as a function of statistics on the variation in the number of blocks present in the buffer by regulating the minimum value so that it is always greater than 1, taking account of a supplementary margin less than the capacity of the buffer expressed as a maximum number of blocks.

If the number of blocks stored reaches the buffer size expressed as a maximum number of blocks, the generator 306 generates an alarm indicating that abnormal behavior of the network (excessive time fluctuations) has been detected.

This variant of the decompression device therefore has the advantages of, firstly, being able to receive blocks of data out of order, thanks to the memory 305, and, secondly, of being able to tolerate transmission time fluctuations, thanks to the offset that is introduced.

What is described hereinafter is directly related to the spirit of the invention of the INV1 application.

The principle of the invention consists in analyzing the content of each channel (carried by two bits in the previous modes, but equally well by 1, 2, 4 or 8 bits, depending on the transmission mode—this is not limiting on the invention); if the channel analyzed is constituted of the consecutive repetition of a reference pattern or reference window throughout an analysis window, it is compressed; for example, for a reference pattern on four bits, corresponding to the state of the bit considered during the last four frames preceding the current analysis window:

if the reference frame=1011, for example,
the channel is compressed if, during the analysis window, the successive content of the channel considered (coded on one bit in this example) is equal to:
a b c d a b c d a b c d a b c d
if at least one bit differs from the cyclic repetition of the reference pattern, the channel is considered active, i.e. not static, and its content is transmitted in its entirety for the current analysis window; for a compressed channel, no data is transmitted apart from an active channel descriptor (ACD), which identifies the position of the active channels within the frame to be reconstituted. The ACD is also referred to as the state code (designated by the reference number 442 in the previous embodiments of the priority application).

Consequently, instead of being based on the state of only one bit per channel, detecting the change to the static state uses the state of the bit during the last N frames preceding the current analysis window.

An embodiment of the compression method in which N=4 is shown in FIG. 13.

Note that the first two channels of the analysis window 70 repeat with a period of four consecutive frames, in exactly the same way as the reference pattern 71 consisting of the state of the channel during the last four frames preceding the current analysis window 70. A decision is then taken to compress the repeated pattern.

The compression device 301' according to the INV1 invention, shown in FIG. 14, is analogous to the device 301 from FIG. 7, except for a memory 34' for storing L*N current frames forming the analysis window 70 and a memory 35' for storing N frames preceding the analysis window forming the reference pattern.

Similarly, the device 302' in FIG. 15 is analogous to that from FIG. 11, except for the substitution for the memory 51 of a memory 51' for storing the reference pattern (the last four data frames preceding the current compressed frame).

The process is then identical to the process of the priority application explained above:

on the compressor side, suppression of the static channels from the current window, transmission to each analysis window of the state code ACD specifying the position of each active channel in the entry frame, followed by the concatenated content of each active channel;

on the decompressor side, extraction/detection of the state code ACD by the detector 49, and then reconstitution of the structure of the uncompressed frame by inserting the content of each active channel at the position specified by the state code ACD, with repetition for each static channel of the content of its corresponding static bit taken from the reference pattern (new process, instead of retaining the reference bit of the static channel considered), thanks to the comparison/storage of the content of the N last frames preceding the change of the channel to the static state. The reference pattern is transmitted periodically between two blocks of data 44'.

We turn now to a particularly advantageous aspect of the INV1 invention that responds to the requirement to secure the method of recovering concatenated channels transmitted in serial form.

A problem can arise following a serialization or sequencing error, reflected in an offset of the data transmitted, to the right if channels declared non-active have been inserted in error, or to the left if channels declared active have not been inserted.

FIG. 16 shows a frame structure 44' compressed according to the compression method of the INV1 invention starting from a set 500 of NT frames E1 and supplying at the output end of the system, on the decompressor side, the NT frames E1:

This structure begins conventionally with at least one synchronization bit 446 and terminates with stuffing bits 447.

If the device is operating correctly, the number of bits in the concatenated active channels (CAC) field 441' is equal to the number of bits at 1 in the state code, characterizing the position of the active channels within the input frame, multiplied by the number NT of frames in the analysis window.

For example, if ACD=0 1 0 1 1 1 0 1 (binary) with five bits at 1, meaning that five channels are active for the current analysis window, and if NT=16, meaning that the analysis window covers 16 input frames at the level of the compressor, then the number of bits in the CAC field is equal to 5×NT=80 bits; the device compares the eight bits of the frame received, situated 80 bits after the end of the ACD CRC 445; if no formatting or transmission error has occurred, the field obtained in this way is equal to the value established by a delimiter 448 just after the CAC.

However, the delimiter that fixes the boundary between the concatenated active channels and the stuffing bits may be offset from the position it should occupy.

Several errors are possible, induced by binary errors induced at the level of the ACD, the ACD CRC, or the delimiter.

To detect and deal with this kind of situation, which could be the result of a decompression error, various actions are taken, all based on analyzing the content of the delimiter of the received compressed frame (received immediately after the concatenated active channels field as used from the received ACD) and on exploiting the ACD CRC field to detect an error in the transmission of the ACD (or in the CRC associated with the ACD).

The delimiter has a fixed value, set on the compressor side, and equal to 1111 0000, for example.

All the above situations are processed successively by calculating the CRC associated with the ACD, comparing the calculated CRC with the ACD CRC received, and comparing the field received after the concatenated active channels field with the value fixed for the delimiter, using the following method:

normal situation: if the ACD CRC and the delimiter are correct, decompression is effected using the ACD received;

if the ACD CRC is incorrect but the delimiter is correct ("ACD CRC error"), decompression is effected using the ACD received;

if the ACD CRC is correct but the delimiter is incorrect ("delimiter error"), decompression is effected using the ACD received;

if the ACD CRC and the delimiter are both incorrect, a test is carried out to detect if the field of the delimiter is correct, based on the ACD of the preceding compressed frame (changes of channel activity are generally much less frequent than the period of the compressed frames); if the test result is positive ("ACD error"), decompression is effected using the ACD of the preceding compressed frame; if the test result is negative ("decompression error"), decompression is suspended and the output frames are empty.

From this point on, the description relates directly to the spirit of the invention of the present application.

FIG. 18 shows a data multiplexing/demultiplexing system 100 constituting a first embodiment of the invention.

As can be seen in this figure, the system 100 includes a first input/output 101 connected by an A-bis connection to a BSC 22. A second input/output 102 connects the system 100 to the Ethernet network 104 which is itself connected to a plurality of computers 103.

The input/output 101 is connected in the system 100 to an E1 interface 105.

The latter delivers the E1 frames of the traffic from the A-bis link to a compressor 301' as described hereinabove; another input of the interface 105 receives E1 frames decompressed by a decompressor 302' as described hereinabove. The output of the compressor 301' is connected to a first input of a formatting unit 106 and the input of the decompressor is connected to a first output of a deformatting unit 107. The functions of the formatting unit 106 and the deformatting unit 107 are explained hereinafter.

The input/output 102 is connected in the system 100 to an Ethernet port 108. The port 108 supplies the Internet traffic (IP datagram stream) to the input of a buffer memory 109 for preventing short-term congestion. The memory 109 supplies the datagrams to a second input of the formatting unit 106. Thus the memory 109 prevents congestion of Internet traffic caused by short-term variation in the available bandwidth margin. The available bandwidth is calculated over an analysis window period.

The size of the buffer memory 109 is such that it can contain at least one maximum size IP datagram.

The stream of Internet traffic applied to the memory 109 is monitored as a function of the available bandwidth prediction information supplied by a bandwidth prediction unit 110. The prediction unit 110 uses information supplied by the compressor 301' relating to the available capacity between consecutive compressed frames. Note that the prediction unit can be implemented in software.

Accordingly, as explained hereinafter, the unit 106 receives the compressed data from the compressor 301' and the IP datagrams and formats the data and the datagrams in accordance with a particular format to convey them to an input of a modem 111 to which an output of the system 100 is connected, for modulation/coding before transmission to a satellite of the satellite telecommunication network. Of course, inserting IP datagrams into the structure provided for the compressed data block necessitates adapting the format of the Ethernet frames to the released E1 frames.

Conversely, the data blocks that the modem 111 receives from the satellite are demodulated/decoded and then transmitted to an input of the system 100 connected to the deformatting unit 107. The function of the unit 107 is then to split up the data blocks containing the compressed data of the A-bis traffic of the IP datagrams. The decompressed data is directed to the decompressor 302' and the IP datagrams are directed to the Ethernet port 108.

According to the invention, a mechanism for observing the activity state of the GSM channels additionally provides longer-term observation of the state of the available bandwidth. The period for measuring and calculating the available bandwidth is fixed so that the available bandwidth variation from one period to another is small. This mechanism is used to predict the evolution of the available bandwidth and thus to avoid any congestion that could occur during subsequent periods. A margin is systematically added to the predicted evolution of the bandwidth used by the compressed frames; the more reliable the predictions, and the longer the updating period in relation to the rate of evolution of the band used, the lower this margin. For voice traffic carried by GSM channels, the margin can be very low; conversely, for data traffic, the margin is generally high in order to confront the high variability of the data streams to be transmitted. The dominant use of GSM networks for voice traffic in practice enables the use of a low margin. FIG. 10 illustrates this process of predicting the bandwidth used, with the addition of a margin, with a view to knowing the bandwidth that remains available without risk of congestion of the system for multiplexing traffic received via the Ethernet port.

The available bandwidth predictions are used to regulate the data stream fed to the input of the traffic multiplexing device, represented in material terms by the buffer memory 109 and the formatting unit 106. This data stream regulation is effected conventionally, using a TCP type protocol, by non-acknowledgement or negative acknowledgement of packets received, obliging the source to try again to send, generally with a smaller packet size, or by the explicit provision at source of information intended to effect this data stream regulation, which is pertinent in particular if information is not exchanged using the TCP.

Data stream regulation is essential in that it prevents the buffer memory 109 from becoming congested with data packets whose complete transmission cannot be guaranteed within a fixed time period. This principle automatically adjusts the size and the timing of packets supplied via the Ethernet network to the available capacity of the multiplexing device.

Returning to the role of the unit 106, its function is successive subdivision of each IP datagram stored in the buffer memory 109 into sections 112, as shown in FIG. 19, and substitution of each section for the stuffing bits 447 shown in FIG. 16, situated after the data block 441'. It will be noted that the delimitation field 448 between the concatenated active channels (CAC) and the stuffing bit is retained.

Furthermore, there may or may not be a gap between two transmitted datagrams; the structure of the datagrams includes its own delimitation, used to dissociate the datagrams at the time of decompression; it is therefore unnecessary to insert a supplementary delimiter between transmitted datagrams. This is why, in FIG. 19, the IP datagrams #i and #i are transmitted back-to-back and substituted as such for the stuffing bits.

According to a preferred aspect of the invention, data stream management in the traffic multiplexing process comprises the following steps:

The function of predicting the available bandwidth avoids beginning to store in the buffer 109 packets that could not be transmitted because the subsequent residual transmission capacity would be too small to transmit them completely. The available transmission bit rate on the satellite link is frequently lower than the bit rate available in the Ethernet network; it is then necessary to process congestion, i.e. to avoid applying datagrams that cannot be transmitted because of insufficient capacity on the outgoing transmission link. In the contrary situation, i.e. if this precaution is not taken, storing a datagram in the buffer memory 109 is started, but the buffer memory becomes saturated before the end of the current datagram.

The present invention provides two solutions to this problem:

TCP/IP solution: each TCP packet is acknowledged only if the result of the available capacity prediction guarantees transmission of the packet in a time period fixed by a configuration process; otherwise, a negative acknowledgement is returned to the network; the connected equipment tries to send again, with a smaller packet size; this is the most widely used data stream regulation mode, and adjusts the output bit rate of the equipment to suit the available capacity.

IP solution: one solution is that of the IETF's Request For Comments (RFC) 3168: "The addition of ECN to IP". This implies that the terminals are equipped with an "ECN aware" TCP stem. ICMP messages can also be used to alert the TCP of the sending device 100 to congestion.

Furthermore, the available bandwidth predictions can be used to adjust the discard thresholds for packets reaching the buffer against short-term congestion.

FIG. 20 shows a demultiplexing device 113 in the remote receiver terminal. The demultiplexing device 113 is connected to a BSC 114 and the Ethernet network 124. The BSC 114 is connected to an E1 interface 115, and the Ethernet network 124 is connected to a port 123. The demultiplexing device 113, similar to the multiplexing device 100, includes a E1 interface 115, a decompressor 116, a compressor 117, a formatting unit 118, a deformatting unit 120, a prediction unit 121, a buffer memory 122, and a port 123. The formatting unit 118 and deformatting unit 120 of the demultiplexing device 113 are connected to a modem 119.

The IP datagrams are reconstituted in their original form by extracting sections present at each end of compressed data blocks 44" and concatenating them, based on delimitations specific to the IP datagrams, to reconstitute each datagram in its original form.

When it has been reconstituted in its original form, the Internet traffic is directed to the LAN or WLAN to which the user terminal is connected.

The system according to the invention has the advantage of being able to upgrade backhaul satellite links at low cost (with no impact on the radio part) to enable LAN or WLAN connection and to handle Internet traffic in parallel with signaling and A-bis interface traffic.

It reduces the bandwidth requirements for a satellite link providing GSM backhauling and the Internet access service.

The system can also be used to convey Internet traffic for which there is a quality of service requirement, by providing a bandwidth margin relative to the predicted traffic bandwidth of the mobile network interface.

Furthermore, the principle of the device described can be applied to other 2G and 3G mobile network interfaces.

Finally, the device can be applied to terrestrial transmission solutions to mutualize the transmission line of the base station connection with the transmission line of the LAN or WLAN connection.

The operator in a developing country can add the device to a terrestrial transmission link (microwave beams, cables, optical fibers, etc) that has already been installed to exploit unused bandwidth and to offer Internet access with negligible investment.

Of course, the present invention is not limited to the embodiments described and other embodiments of the invention can easily be envisaged by the person skilled in the art.

Thus it should be noted that the invention is not limited to IP datagrams and that any type of data stream can be inserted in the same way, substituted for stuffing bits, and recovered at the time of decompression.

The invention claimed is:

1. A device for multiplexing a first stream of data comprising a set of current data frames coming from a mobile telecommunication network with a second stream of data including IP datagrams coming from an Ethernet network, said data frames having a structure defined by a plurality of time slots, each time slot of a first group of time slots being subdivided into a plurality of information bits carrying a respective communication channel, wherein the multiplexing device comprises:
  a compressor adapted to provide a compressed data block representative of various channels;
  prediction means for predicting available bandwidth, known as a margin, taking account of a band occupied for the transmission of said compressed data block; and
  formatting means for subdividing and inserting at least one section of the IP datagrams in the time slots corresponding to the available bandwidth,
  wherein the bandwidth assigned for a given transmission link is predetermined, and
  the formatting means determines whether size of a section of the IP datagrams is too large for insertion in the time slots based on the predicted available bandwidth.

2. The device according to claim 1, wherein the multiplexing device further comprises memory means for storing at least one IP datagram to prevent congestion of datagrams caused by short-term variation of the available bandwidth.

3. The device according to claim 2, wherein said memory means rejects the IP datagram sections that cannot be transmitted because of insufficient capacity on the given transmission link.

4. The device according to claim 2, wherein the memory means exclusively stores the IP datagrams.

5. A multiplexing/demultiplexing system comprising:
  the multiplexing device according to claim 1; and
  a demultiplexing device adapted to demultiplex the compressed data block comprising a compressed block and at least one IP datagram section, wherein the demultiplexing device comprises:
  deformatting means for extracting IP datagram sections and concatenating the IP datagram sections in order to direct them to the Ethernet network; and
  data decompression means for reconstituting active and static channels from the compressed data block.

6. The device according to claim 1, wherein the compressed data block comprises voice data from the telecommunications network transmitted in frames and wherein the at least one section of the IP datagrams is provided from a different network and is inserted into a frame carrying the voice data.

7. The method according to claim 1, wherein, when the formatting means determines that the size of the section of the IP datagrams is too large, a source of the IP datagrams is notified to resend data in a smaller size so that a smaller IP datagram can be inserted into the predicted available bandwidth.

8. The method according to claim 1, wherein the multiplexing device further comprises a prediction unit which uses information, supplied by the compressor, of an available capacity between compressed data blocks to determine the predicted available bandwidth.

9. The device according to claim 1, wherein the prediction means predicts the available bandwidth over a fixed window of analysis.

10. The device according to claim 1, wherein the predictions means predicts the available bandwidth based on available capacity between consecutive compressed frames.

11. A device for multiplexing a first stream of data comprising a set of current data frames coming from a mobile telecommunication network with a second stream of data including IP datagrams coming from an Ethernet network, said data frames having a structure defined by a plurality of time slots, each time slot of a first group of time slots being subdivided into a plurality of information bits carrying a respective communication channel, wherein the multiplexing device comprises:
  a compressor adapted to provide a compressed data block representative of various channels;
  prediction means for predicting available bandwidth, known as a margin, taking account of a band occupied for the transmission of said compressed data block; and
  formatting means for subdividing and inserting at least one section of the IP datagrams in the time slots corresponding to the available bandwidth,
  wherein the compressor comprises:
    analyzer means for analyzing at least one channel in an analysis window of the current data frames to determine whether the channel is active or static, an active state being assigned to the channel if a comparison between a number of reference frames (N frames), which represents a reference pattern, and a corresponding N frames of the analysis window shows a variation in frame content for at least one of the frames, a static state being assigned to the channel if all the N reference frames are the same as the current data frames that correspond to the N reference frames, where N is an integer greater than or equal to 1;
    extraction means for extracting a content of active channels of the analysis window as a function of states assigned by said analyzer means;
    location means adapted to provide indications of a location of data content in the current data frames as a function of the states assigned by said analyzer means; and
    grouping means for grouping at least one identifier of the data content of a current block and of the location of data content within a data block to be sent, and
  wherein the bandwidth assigned for a given transmission link is predetermined.

12. The device according to claim 11, wherein the number N of frames in the reference pattern is an integer greater than 1.

13. The device according to claim 11, wherein the number N of frames in the reference pattern is dynamically determined based on reliability of bandwidth predictions by the prediction means over successive analysis window periods.

14. A demultiplexing device adapted to demultiplex a compressed data block comprising a compressed block and at least one IP datagram section, wherein the demultiplexing device comprises:
  deformatting means for extracting the at least one IP datagram section from a frame comprising data from a mobile telecommunication network and the at least one IP datagram section and concatenating a plurality of IP datagram sections in order to direct at least one of the plurality of IP datagram sections to an Ethernet network; and data decompression means for reconstituting active and static channels from the compressed data block.

15. The device according to claim 14, wherein the compressed block comprises voice data from the telecommunications network, wherein the frame received by the demultiplexing device comprises the voice data and at least one section of the IP datagrams, and wherein the deformatting means extract the at least one section of the IP datagrams from the frame comprising the voice data.

16. The method according to claim 14, wherein the demultiplexing device further comprises a transmission module that provides the concatenated IP datagram sections to the Ethernet network.

17. A device for multiplexing a first stream of data comprising a set of current data frames coming from a mobile telecommunication network with a second stream of data including IP datagrams coming from an Ethernet network, said data frames having a structure defined by a plurality of time slots, each time slot of a first group of time slots being subdivided into a plurality of information bits carrying a respective communication channel, wherein the multiplexing device comprises:

a compressor adapted to provide a compressed data block representative of various channels;

prediction means for predicting available bandwidth, known as a margin, taking account of a band occupied for the transmission of said compressed data block; and formatting means for subdividing and inserting at least one section of the IP datagrams in the time slots corresponding to the predicted available bandwidth, wherein said predicted available bandwidth assigned for a given transmission link is predetermined, and the formatting means determines transmission size of IP datagram sections based on negative acknowledgement from said prediction means when the section to be sent is too large.

18. The device according to claim 17, wherein a resizing means resizes the IP datagram sections for transmission upon the negative acknowledgement and adjusts output bit rate to suit the predicted available bandwidth.

19. The method according to claim 17, wherein the negative acknowledgement indicates that an IP datagram was not received.

20. The device according to claim 17, wherein the negative acknowledgement is sent to the mobile telecommunication network and a smaller section of the IP datagram is provided to the multiplexing device.

\* \* \* \* \*